UNITED STATES PATENT OFFICE.

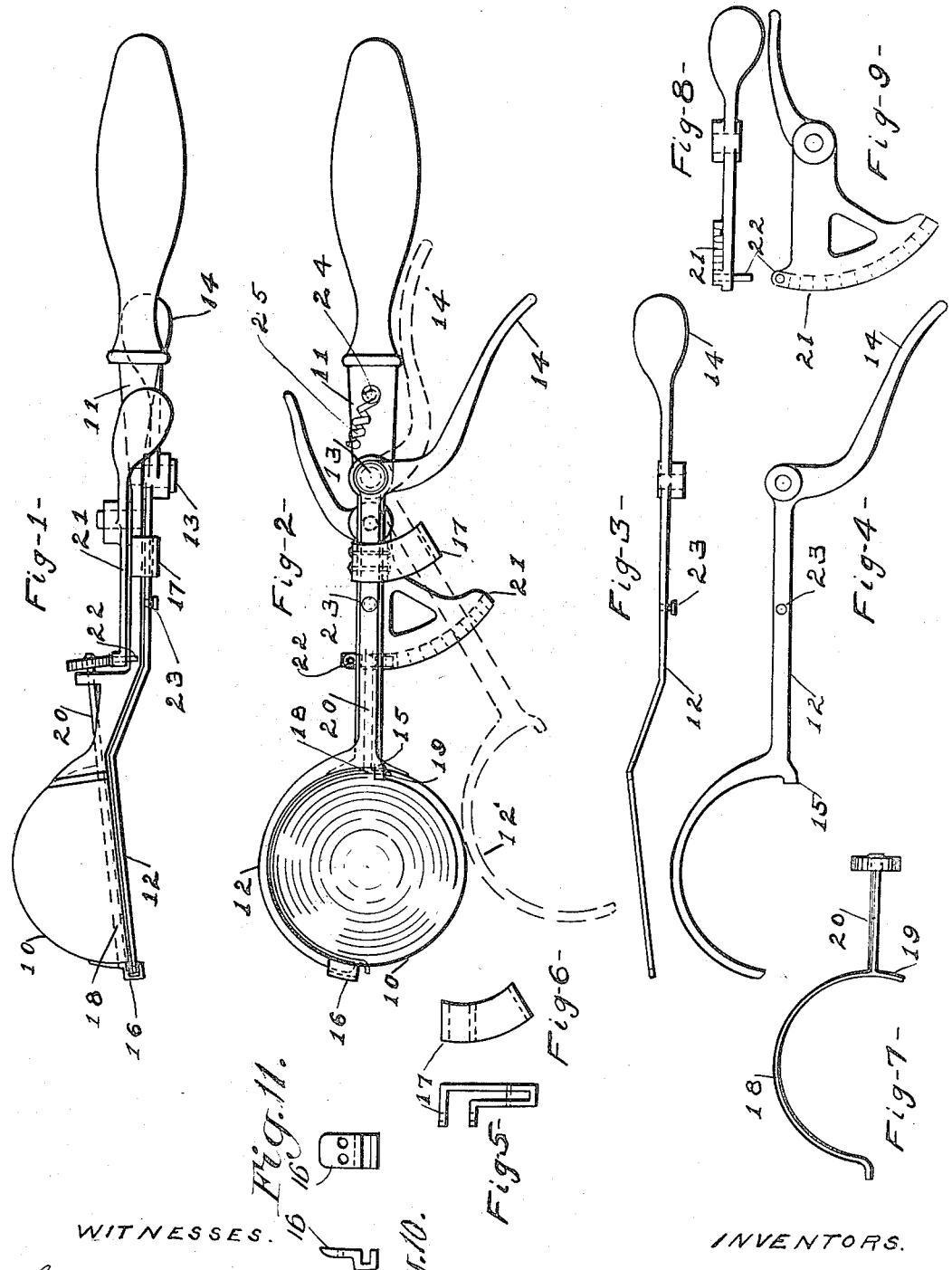

FRANK W. GRANT AND GEORGE ENNIS HOLMES, OF DOVER, NEW HAMPSHIRE.

ICE-CREAM SPOON.

1,188,757.   Specification of Letters Patent.   Patented June 27, 1916.

Application filed February 23, 1915. Serial No. 10,116.

*To all whom it may concern:*

Be it known that we, FRANK W. GRANT and GEORGE E. HOLMES, of Dover, county of Strafford, and State of New Hampshire, have invented an Improvement in Ice-Cream Spoons, of which the following description, in connection with the accompanying drawings, is a specification, like figures and like letters representing like parts.

This invention pertains to ice cream spoons, particularly adapted, designed and constructed, for serving ice cream at soda fountains, banquets, &c., the object being, to equip the spoon with a handy quickly and easily operated cleaver device, for removing the heaped up surplus of ice cream from off the top of the bowl, said cleaver device being so constructed that the operation of cleaving the ice cream from off the top of bowl, must take place before the ice cream can be released and dropped out of bowl, thus making a very practical improvement in ice cream dishers over the impractical ones with leveling blade which operates simultaneously with the releasing blade, or, those which are so constructed as to allow the releasing device to be operated before the leveling blade is operated, thereby, measuring out an exact amount each time, and protecting the employer against careless clerks, who are likely when very busy, to serve out over measurements.

The invention consists in the combination of a cleaver device, and a bowl and handle. The cleaver device is so constructed that it is in no way an obstruction in filling the bowl with ice cream, on account of its sickle shape, as it occupies only a small space conforming with the outside top of bowl, and is well protected by a guard which prevents it from getting out of position.

The cleaver device, consists of a sickle shaped blade, shank, and finger piece for operating same.

The cleaver device consists of a sickle shaped blade so constructed as to conform around the right hand edge of the top of the bowl, with the shank of the cleaver device continuing up over front of handle, and pivoted thereon about midway, and operated by means of a finger piece which is a part of the cleaver device, and extends from left of pivot in a suitable position to be operated by a finger pressed against the tension of a spring toward the handle, thereby forcing the clever blade to pass from right to left over the top of bowl, in alinement with the handle, thus cleaving off the surplus ice cream, flush with the top of the bowl, at which period the ice cream may be released and dropped out of the bowl. By means of a spring, cleaver returns to original position.

Figure 1 shows in the side elevation, an ice cream spoon embodying this invention. Fig. 2 shows a top view of spoon shown in Fig. 1. Fig. 3 inside elevation, a detail of the means for removing the surplus ice cream from off the top, flush with bowl. Fig. 4 a top view of detail shown in Fig. 3. Fig. 5 a view looking from bowl end of spoon, a guard, to keep the cleaver in its proper pathway, while passing over the top of spoon. Fig. 6 a top view of view shown in Fig. 5. Fig. 7 a top view of bail shaped releasing blade with its extension piece. Figs. 8 and 9 are simply shown in detail to avoid confusion of assembled view in Figs. 1 and 2. Fig. 10 is a side elevation in detail of guard 16. Fig. 11 is a front view of Fig. 10.

The bowl 10 is hereby represented as hemispherical, and secured to a suitable handle 11.

12 shows the cleaver device with sickle shape conforming to the outside right hand top of bowl, with continuation of shank up over the front of handle, in alinement with same, being pivoted by a pin at 13 with finger piece 14 extending out from fulcrum point.

15 is a projecting lug, the object of which is, to prevent rotation of bail shaped releaser blade 18, through contact of extension 19 on same, as will be seen in explanation of the operation of the device.

16 is a guard fastened to bowl in such a position to form a protection for the cleaver blade, when the blade is back in its normal position on bowl.

17 shows the guard, which is designed to keep the cleaver blade in its proper pathway, in closely passing over the top of the bowl.

19 is an extension on releaser blade 18, designed to project beyond its axis of rotation, and is kept in position by lug 15, previously described, until 12 has first performed the operation of cleaving.

20 is the releaser blade pinion shaft having on one end a toothed pinion which is engaged by the teeth of the segmental lever 21 by which means the releaser blade is revolved in the bowl, and thereby the ice cream released.

22 is a stop lug on segmental lever to limit the amount of throw of the lever.

23 is a pin in cleaner blade to fasten one end of the return spring, the other end of spring being fastened to pin 24 in the shank; 14' shows in dotted lines, the finger end of cleaver and 12' shows in dotted lines the cutting of cleaver after the cleaving device has performed the operation of cutting off the surplus ice cream from top of bowl.

The operation of the device is as follows: The dispenser fills the bowl of spoon with ice cream, and then presses finger piece 14, best shown in Fig. 2 against the tension of spring 25, thereby forcing the cleaver blade to travel in its guarded pathway, across the top of bowl from right to left, removing the surplus ice cream from off the top of bowl as it does so, after which operation has been completed, the ice cream can be released from the bowl and dropped out in the ordinary way, by the bail shaped releaser blade 18, which, after having returned to its original position, the cleaver blade 12, is in turn returned to its own position again, by means of spring 25.

The main point in this invention is, to so construct the cleaver, in connection with the bowl and handle, as to make it impossible to release the ice cream from the bowl, until after it had properly been cleaved from off the top of same, thus insuring a proper amount each time, and at the same time, protecting the employer against carelessness of clerks, and we accomplish this fact, by providing an extension piece 19 in Fig. 7, which is prevented from rotating by lug 15 in Fig. 4 until the cleaver blade has moved out of its original position, from right to left, thereby performing the cleaving operation, the object we have sought to attain.

We do not claim as a part of our invention, the means of operation of the bail shaped cream removing device.

What we claim as new and original, and wish to be secured by Letters Patent, is:

1. In an ice cream disher consisting of a bowl attached to a handle, a bail-shaped scraper in the bowl having an extension piece, a cleaver blade of a sickle shape conforming with the outside top edge of the bowl and having a shank pivoted to the handle, a finger piece for operating said cleaver blade, said blade having a projecting lug so located thereon as to come in contact with the extension piece on the bail-shaped scraper thereby preventing the rotation of said scraper until the lug and the cleaver blade itself has also passed beyond the extension piece on the scraper.

2. In an ice cream disher consisting of a bowl attached to a handle, a cleaver blade having a shank and finger piece pivoted to the handle, said cleaver blade having a projecting lug, a bail-shaped scraper within the bowl, means for rotating said scraper, the scraper having an extension piece coöperating with the projecting lug on the cleaver blade, to prevent rotation of the scraper within the bowl, until the lug and cleaver blade have passed out of contact with the extension piece on the bail-shaped scraper.

3. In an ice cream disher consisting of a bowl attached to a handle, a bail-shaped scraper in the bowl having an extension piece, means for rotating same, a cleaver blade pivoted on the handle and having a shank, finger piece and projecting lug, the last named element so located thereon as to form a locking device against movement of the bail-shaped scraper during the initial movement of the cleaver but permitting rotation of the scraper after the cleaver has passed beyond the extension piece on the bail-shaped scraper.

4. In an ice cream disher consisting of a bowl attached to handle, a cleaver blade pivoted on the handle and having a shank, finger piece and projecting locking lug, a bail-shaped scraper adapted to be rotated within said bowl, said scraper having an extension piece coöperating with said lug on the cleaver, a guard so positioned on the outside edge of the bowl as to form a protection for the cleaver blade when the disher is brought in contact with the inside walls of the cream container while dishing out the ice cream.

5. In an ice cream disher consisting of a bowl attached to a handle, a cleaver blade pivoted on the handle having a finger piece and a projecting locking lug, a bail-shaped scraper having an extension piece, means for operating said scraper, said extension piece coöperating with the lug on the cleaver blade to lock the scraper against movement during initial movement of the cleaver, a protecting guard for the cleaver attached to the bowl, a guiding piece attached to the handle to limit the travel of and guide the cleaver blade in its course back and forth across the bowl top.

6. In an ice cream disher consisting of a bowl attached to a handle, a cleaver blade having a shank and finger piece, pivoted on the handle, a projecting locking lug on the said blade, a bail-shaped scraper adapted to be rotated and having an extension piece coöperating with the lug on the cleaver blade, to lock the scraper against movement during the initial movement of the cleaver blade, a guard for the cleaver blade attached to the bowl, a guiding piece for the cleaver blade attached to the handle, a spring having one end attached to the cleaver and the other end to the handle and adapted to return the cleaver to its initial position.

In testimony whereof we have signed our names to this specification in the presence of two subscribing witnesses.

FRANK W. GRANT.
GEORGE ENNIS HOLMES.

Witnesses:
JOHN A. DREW,
HELEN E. EYRES.